(12) United States Patent
Ye

(10) Patent No.: US 7,549,799 B2
(45) Date of Patent: Jun. 23, 2009

(54) RADIOGRAHIC SYSTEM

(75) Inventor: Bin Ye, Beijing (CN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 11/966,579

(22) Filed: Dec. 28, 2007

(65) Prior Publication Data
US 2008/0159485 A1 Jul. 3, 2008

(30) Foreign Application Priority Data
Dec. 30, 2006 (CN) .................... 2006 1 0172303

(51) Int. Cl.
*H01J 31/49* (2006.01)
(52) U.S. Cl. ...................... 378/189; 378/204
(58) Field of Classification Search ............... 378/167, 378/177–179, 189, 204
See application file for complete search history.

(56) References Cited
U.S. PATENT DOCUMENTS
6,152,598 A 11/2000 Tomisaki et al.
7,401,977 B2 * 7/2008 Graumann et al. .......... 378/205
2008/0159486 A1 * 7/2008 Hesl et al. .................. 378/189

FOREIGN PATENT DOCUMENTS
JP 2002247289 8/2002
JP 2002247289 A1 8/2002

* cited by examiner

*Primary Examiner*—Jurie Yun
(74) *Attorney, Agent, or Firm*—Armstrong Teasdale LLP

(57) ABSTRACT

A radiographic system (100) is provided wherein a single X-ray detector can be handled freely using a cable and which can prevent an operator or a patient from being troubled by the cable. The radiographic system (100) comprises a radiographic panel (5) configured to radiograph in two dimensions a radiation exposed to a subject and output radiation image data, a cable (6) for the supply of electric power to the radiographic panel and transfer of the radiation image data, a conveyance unit (8) for conveying the cable in a predetermined direction, a cable length adjusting unit (7) provided in the conveyance unit to adjust the length of the cable, and a movement control unit (72) configured to move the conveyance unit in accordance with a tilting direction of the cable from the cable length adjusting unit to the radiographic panel.

18 Claims, 6 Drawing Sheets

RADIOGRAHIC SYSTEM

CROSS REFERENCE TO RELATED APPLICATIONS

This application claims the benefit of Chinese Patent Application No. 200610172303.7 filed Dec. 30, 2006, which is hereby incorporated by reference in its entirety.

BACKGROUND OF THE INVENTION

The present invention relates to a radiographic system (a radiation CR (Computed Radiography) system) and more concretely to an X-ray radiographic system. Particularly, the present invention is concerned with a radiographic system able to perform a stand type X-ray radiographic and a table type X-ray radiographic in a separate manner.

In diagnosing a patient, an X-ray radioscopic image of the patent in a stand-up state or in a lying-down state on a table is obtained using an X-ray radiographic system in accordance with the state of a disease or a wound of the patient. In this case, it is possible for the X-ray radiographic system to rotate the table into a stand-up state of the patient and perform X-ray radiographic in this state. However, it costs very high to provide a mechanism for rotating the table while bearing the weight of the patient.

In view of this point it is possible to provide an X-ray radiographic system having a light receiving surface on a stand and a light receiving surface on a table. According to such a construction, an X-ray radioscopic image can be obtained easily while the patient remains standing up or lies down on the table (Japanese Patent Laid-Open Publication No. 2002-247289 for example).

However, it costs high to dispose X-ray detectors on the light receiving surface of the stand and the light receiving surface of the table, respectively. Besides, if the movement range of an X-ray detector is limited like that of the X-ray detector disposed on the stand or the X-ray detector disposed on the table, the patient is compelled to take a forced posture in case of obtaining an X-ray radioscopic image of a wrist or an ankle. Taking this point into account, it is preferable that a single X-ray detector be made capable of being handled freely.

However, even if a single X-ray detector is merely made capable of being handled freely with use of a cable, if the cable is placed on the floor surface within the room concerned, there is a fear that the operator or the patient may stumble over the cable and fall down.

Accordingly, it is an object of the present invention to provide an X-ray radiographic system wherein a single X-ray detector can be handled freely without causing an obstacle to an operator or a patient.

It is an object of the present invention to provide a radiographic system wherein a single X-ray detector can be handled freely with use of a cable and which prevents an operator or a patient from being troubled by the cable. It is another object of the present invention to reduce the manufacturing cost and maintenance cost as a result of using a single X-ray detector.

SUMMARY OF THE INVENTION

In a first aspect of the present invention there is provided a radiographic system comprising a radiographic panel configured to radiograph in two dimensions a radiation exposed to a subject and output radiation image data, a cable for the supply of electric power to the radiographic panel and transfer of the radiation image data, a conveyance unit for conveying the cable in a predetermined direction, a cable length adjusting unit provided in the conveyance unit to adjust the length of the cable, and a movement control unit configured to move the conveyance unit in accordance with a tilting direction of the cable from the cable length adjusting unit to the radiographic panel.

According to the radiographic system in this first aspect, the conveyance unit moves in accordance with a tilting direction of the cable from the cable length adjusting unit to the radiographic panel. Consequently, the cable length adjusting unit moves in the moving direction of the radiographic panel and thus any useless pulling force does not occur between the radiographic panel and the cable. The operator can move the radiographic panel without feeling the weight of the cable 6.

In a second aspect of the present invention, the conveyance unit and the cable length adjusting unit are disposed in the ceiling within a diagnosing room.

According to the radiographic system in this second aspect, the cable does not lie on the floor in the diagnosing room because the conveyance unit and the cable length adjusting unit are disposed in the ceiling of the room. There is no fear that the operator or the patient may stumble over the cable and fall down. Since the conveyance unit and the cable length adjusting unit moves the radiographic panel in the direction of the installation place, the cable 6 extends vertically downward from the ceiling and therefore does not obstruct the motion of the operator or the patient.

The radiographic system in a third aspect of the present invention further comprises a detector for detecting the tilting direction of the cable.

According to the radiographic system in this third aspect, the tilting of the cable is detected by a detector. In the detector is included a sensor having a mechanical contact or a sensor which detects the tilting in a non-contact manner using laser light or electromagnetism. The type of the detector is not specially limited.

According to the radiographic system in a fourth aspect of the present invention, the moving speed of the conveyance unit is changed in accordance with the angle of the tilting direction detected by the detector.

According to this radiographic system it is possible to enhance the working efficiency of the operator. That is, when moving the radiographic panel from the present position to a distant position, the cable 6 is tilted largely. In such a case, the conveyance unit can speed up, then upon approaching a desired position and upon decrease of the cable tilting angle, the conveyance unit can slow down.

In a fifth aspect of the present invention, the radiographic panel has an adjusting switch for adjusting the length of the cable.

According to the radiographic system in this fifth aspect, the cable length must be changeable when adjusting the cable length. On the other hand, after the cable length is once adjusted, the cable length must be fixed to the adjusted length. In this case, since the radiographic panel is provided with the adjusting switch, the operator can push the same switch by the hand which holds the radiographic panel and thus the operation is simple.

In a sixth aspect of the present invention, the conveyance unit comprises a first conveyance unit configured to move in the predetermined direction and a second conveyance unit configured to move in a direction orthogonal to the predetermined direction.

According to the radiographic system in this sixth aspect, the conveyance unit can freely move in a so-called XY plane. That is, no matter in which position within the diagnosing room the radiographic panel may be placed, the cable can be extended vertically downward from the ceiling. The layout of the table, etc. can be set arbitrarily within the diagnosing room.

The radiographic system in a seventh aspect of the present invention further comprises a stand for radiographic the subject in a stand-up state and a table for radiographic the subject in a lying-down state, the stand and the table being each provided with a receptacle shelf for insertion therein of the radiographic panel.

Since the radiographic system in this seventh aspect has the stand and the table and receptacle shelves for insertion therein of the radiographic panel are formed in the stand and the table respectively, the system can be set easily to a typical radiographic mode. Besides, since a single radiographic panel can be used in both stand and table, it is possible to attain the reduction of cost.

In an eighth aspect of the present invention, the radiographic panel has a handle for grasping the radiographic panel itself, and the adjusting switch in the fifth aspect is disposed in the handle or in the vicinity of the handle.

In the radiographic system according to this eighth aspect, since the radiographic panel has a handle for grasping the radiographic panel itself, it is easy for the operator to draw out the cable. Besides, the operation is simple because the cable length adjusting switch is provided in the handle or in the vicinity of the handle.

In a ninth aspect of the present invention, the cable length adjusting unit has a reel for winding up the cable and a spring for pulling the cable.

According to the radiographic system in this ninth aspect, the cable length can be adjusted using the take-up reel which utilizes a spring. Since the spring is used, the structure is simple. Besides, since electricity is not used, it is possible to reduce the cost of management and repair.

According to the radiographic system of the present invention, a single radiographic panel can be handled freely with use of a cable connected to the same panel. Further, there is no fear of the operator or patient being troubled by the cable.

DETAILED DESCRIPTION OF THE INVENTION

First Embodiment

Entire Configuration of X-ray Radiographic System

Figure 1:
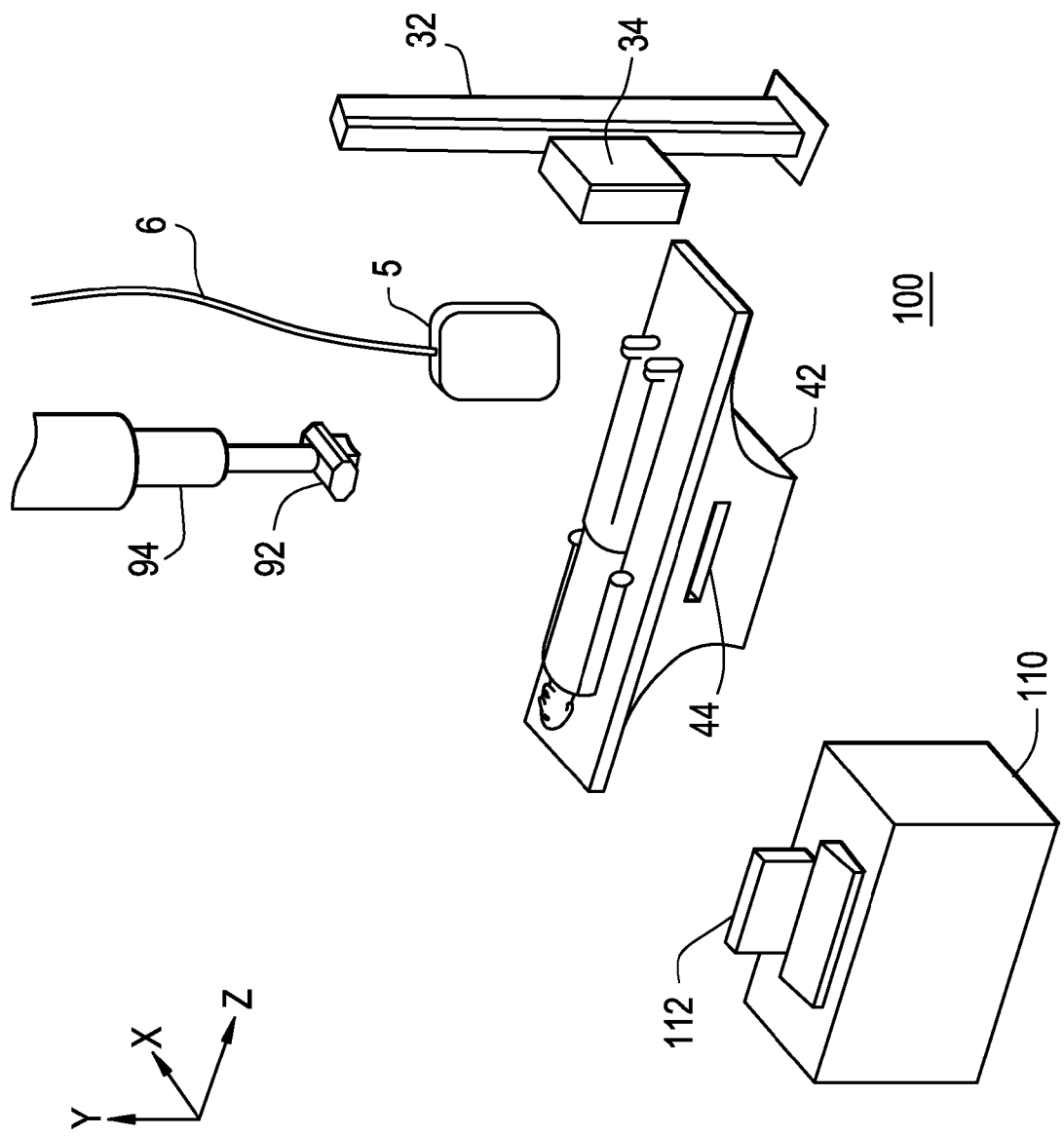
FIG. 1 is a perspective view showing the configuration of an X-ray radiographic system 100 for obtaining an X-ray radioscopic image of a patient according to a first embodiment of the present invention.

FIG. 1 is a perspective view showing the configuration of an X-ray radiographic system (CR: Computed Radiography) 100 for obtaining an X-ray radioscopic image of a patient. This system roughly includes a table 42 on which the patient lies down, a stand 32 for radiographic in a stand-up state of the patient, an X-ray tube 92 for irradiation of X-ray, a flat panel detector 5 for detecting X-ray having passed through the patient, and an operation console 110. The operation console 110 displays on a display 112 an X-ray radioscopic image on the basis of image data transferred thereto from the flat panel detector 5. An X-ray power supply unit is provided within the operation console 110 to supply the X-ray tube 92 with electric power.

The X-ray tube 92 is suspended from the ceiling in a diagnosing room through a support rod 94 capable of expansion and contraction. The X-ray tube 92 is driven by the X-ray power supply unit and in turn drives a collimator (not shown) to designate an irradiation field and emits an X-ray beam. The flat panel detector 5 is suspended from the ceiling through a flexible cable 6. The X-ray radiographic system 100 is disposed within a diagnosing room 201 (see FIG. 2). The operation console 110 may be disposed in an operation room separate from the diagnosing room 201.

The flat panel detector 5 can be inserted into a stand detector receiving shelf 34 attached to the stand 32 and can also be inserted into a table detector receiving shelf 44 provided in the table 42. The flat panel detector 5 can be disposed in an arbitrary position through the cable 6 and therefore can also be disposed in any other portion than the stand detector receiving shelf 34 and the table detector receiving shelf 44. For example, when an X-ray radioscopic image of a bone-fractured wrist is to be obtained, the flat panel detector 5 may be disposed on a desk (not shown) and it is possible to put the wrist thereon and perform radiographic.

Figure 2:
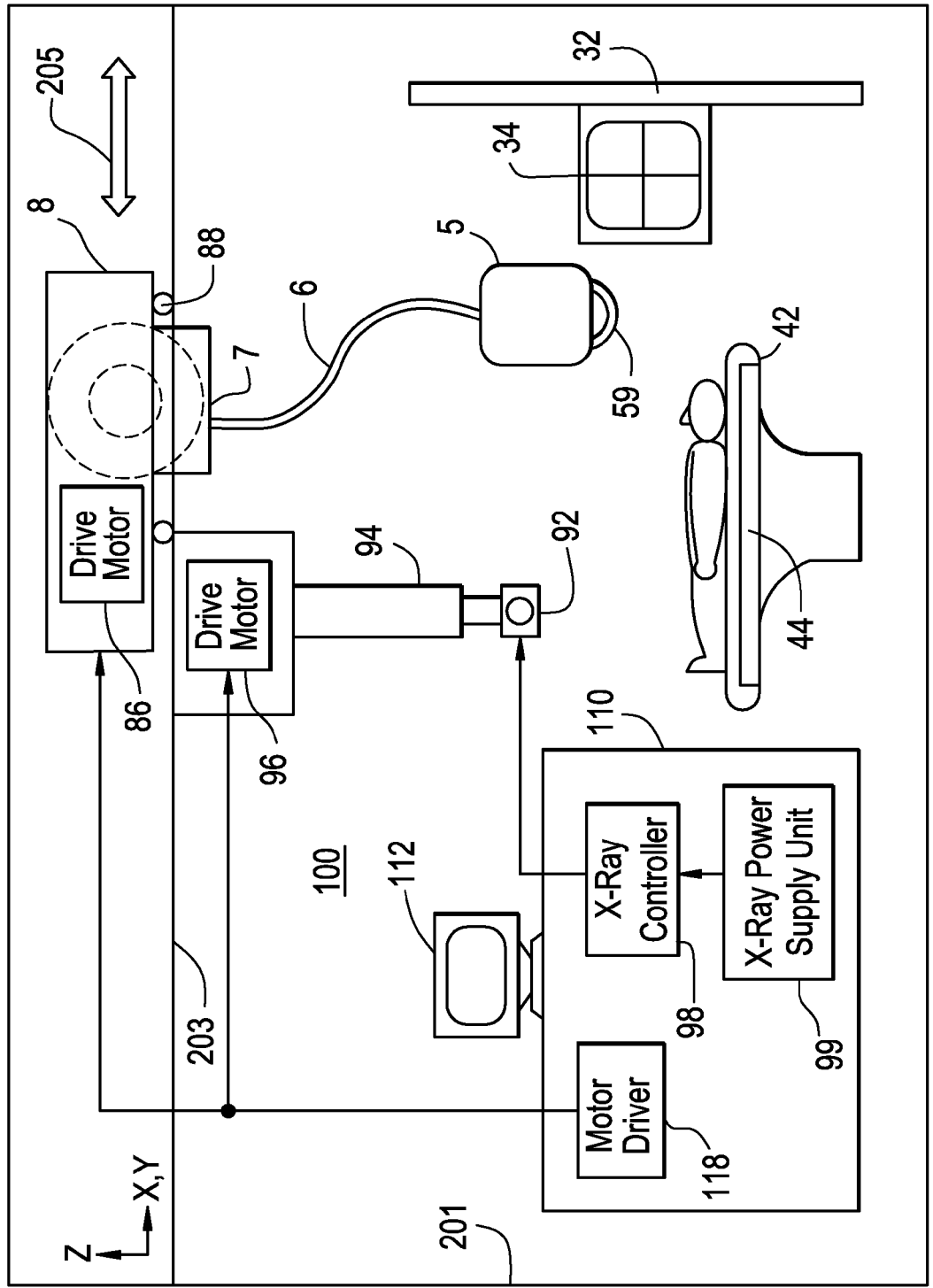
FIG. 2 is a block diagram showing the configuration of the X-ray radiographic system 100 of the first embodiment.

FIG. 2 is a block diagram showing the configuration of the X-ray radiographic system 100 of this embodiment. The X-ray radiographic system 100 is disposed within the diagnosing room 201. The support rod 94 which supports the X-ray tube 92 is suspended from the ceiling indicated at 203. Therefore, a sufficient floor space is ensured and the operator or the patient is easy to move. The X-ray tube 92 is connected to an X-ray tube controller 98, which in turn is connected to an X-ray power supply unit 99. With this arrangement, a predetermined X-ray can be applied to the patient. A collimator (not shown) having an aperture for limiting an irradiation range of X-ray is provided within the X-ray tube 92. The support rod 94 is provided with a support rod driving motor 96 and can expand and contract vertically. The support rod driving motor 96 is controlled by a motor driver 118. The X-ray tube 92 and the support rod 94 are connected together by a ball joint structure. The X-ray tube 92 is rotatable in 360° directions with respect to Z axis and is rotatable also with respect to X or Y axis. Thus, X-ray can be radiated in any direction in accordance with a imaging portion of the patient.

The flat panel detector 5 is suspended from the ceiling 303 through the flexible cable 6. Since the cable 6 is not present on the floor surface, there is no fear of the operator or the patient stumbling over the cable. Since the cable 6 is flexible, the position of the flat panel detector 5 can be changed freely in accordance with the posture (standing-up, sitting, or lying-down) of the patient or a imaging portion of the patient. If an extra portion of the cable 6 is suspended, the operator or the patient may contact the cable 6. To avoid such a possibility, a cable length adjusting unit 7 adjusts the length of the cable 6 into an appropriate length. To make it easier for the operator to pull out the cable 6 connected to the flat panel detector 5 from the cable length adjusting unit 7, the flat panel detector 5 is provided with a handle 59. Unless the cable 6 is suspended straight from the ceiling 203, the connection between the flat panel detector 5 and the cable 6 is pulled and becomes easier to break. Further, the cable 6 comes into contact with the operator or the patient. To avoid such an inconvenience, there is provided a carrier 8 which carries the cable length adjusting unit 7 thereon. The carrier 8 is provided with bearings 88 and a carrier driving motor 86 and is movable in X- and Y-axis directions indicated by an arrow 205. The carrier driving motor 86 is controlled by the motor driver 118.

Although the stand 32 is fixed in FIG. 2, it may be made movable using tires. Likewise, although the table 42 is fixed, it may be made movable using tires. The stand detector receiving shelf 34 attached to the stand 32 is configured to be vertically movable in accordance with an imaging portion of the patient. At the time of radiographic, the flat panel detector 5 is inserted into the stand detector receiving shelf 34. The table detector receiving shelf 44 provided in the table 42 is configured to be movable right and left in accordance with an imaging portion, for example, the head or legs, of the patient. In radiographic, the flat panel detector 5 is inserted into the table detector receiving shelf 44.

The operation console 110 has an aperture controlling motor driver for the collimator (not shown). Image date collected by the flat panel detector 5 are transmitted to the operation console 110 and an X-ray radioscopic image is displayed on a display 112 on the basis of the image data.

Configuration of the cable length adjusting unit 7 and that of the carrier 8.

Figure 3:
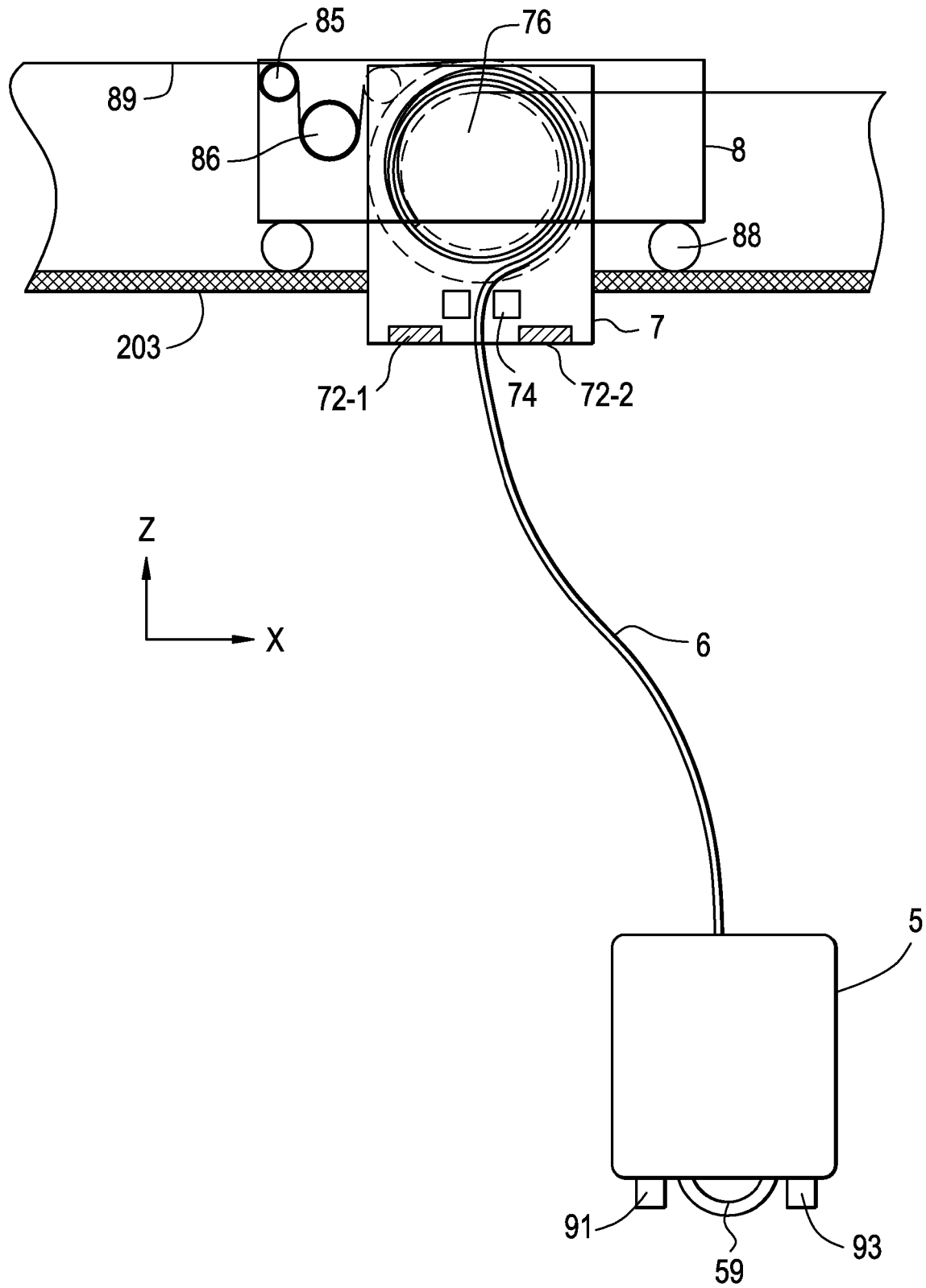
FIG. 3 is a see-through diagram showing the configuration of a cable length adjusting unit 7 and that of a carrier 8.

FIG. 3 is a see-through diagram showing the configuration of the cable length adjusting unit 7 and that of the carrier 8.

The cable length adjusting unit 7 is provided with a sensor 72 for measuring the inclination of the cable 6. As the sensor 72 there may be used any of various types of sensors. For example, upon contact of the cable 6 with a sensor 72-1, it is possible to determine that the cable 6 is inclined in −X axis direction. On the other hand, upon contact of the cable 6 with a sensor 72-2, it is possible to determine that the cable 6 is inclined in +X axis direction. If the sensor 72 is an optical sensor adapted to emit and receive plural laser beams, the sensor 72 can measure the degree of inclination of the cable 6. In this embodiment reference will be made to the case where the sensor 72 is an optical sensor.

The cable length adjusting unit 7 is further provided with a clamp portion 74 and a take-up reel 76. The take-up reel 76 takes up the cable 6 lest an extra portion of the cable should protrude to the exterior. A spiral spring is disposed within the take-up reel 76 to pull the cable 6 with a certain pulling force constantly. Since the take-up reel 76 rotates, plural ring-like contacts are concentrically on the reel 76. Ends of lines such as a power supply cable 6-1 (see FIG. 5) for the supply of electric power to the flat panel detector 5 and an image signal cable 6-2 from the flat panel detector 5 are connected one by one to those rings respectively. According to such a configuration there is no fear of the cable 6 being twisted.

Although in this embodiment the spiral spring is disposed within the take-up reel 7, taking in and out of the cable may be done using an electric motor. If the electric motor is equipped with a brake, the clamp portion 74 need not be provided. That is, a length adjusting switch for taking in and out of the cable 6 is provided in the flat panel detector 5. There may be adopted a configuration such that when the length adjusting switch is slid in a predetermined direction, the electric motor rotates and the cable extends, while when the same switch is slid in an opposite direction, the electric motor rotates reverse and the cable 6 is wound up, further, when the switch is returned to a middle position as a home position, the brake is applied to the electric motor. It is preferable that such an adjusting switch be disposed near the handle 59 or in the handle 59 itself.

The cable 6 is pulled constantly. Therefore, the clamp portion 74 clamps the cable 6 lest the flat panel detector 5 should be wound up completely. The clamp portion 74 may clamp the cable 6 electromagnetically or may clamp the cable 6 mechanically using a ratchet pawl and a brake. In this embodiment, an example of an electromagnetic lamp portion 74 will be described. The flat panel detector 5 is provided with a clamp button 91 and a clamp cancel button 93 and controls the clamp portion 74 by wire or wireless. More specifically, when the clamp button 91 is pushed, the electromagnetic clamp portion 74 clamps the cable 6, while when the clamp cancel button 93 is pushed, the electromagnetic clamp portion 74 releases the cable 6. It is usually when the cable 6 is to be pulled out from the cable length adjusting unit 7 that the operator grasps the handle 59. Therefore, it is preferable that the clamp cancel button 93 be disposed near the handle 59 or in the handle 59 itself.

In the carrier 8, as shown in FIG. 3, a pulley 85 and a pulley of the carrier driving motor 86 are engaged with a wire 89 which is stretched in X axis direction on the ceiling. When the driving motor 86 rotates clockwise or counterclockwise, the carrier 8 moves rightwards or leftwards along a track of the bearings 88. The driving structure is not limited to the combined structure of the pulley 85 and the wire 89. The carrier 8 may be moved directly using a linear motor or tires may be rotated by a driving motor. It is also possible to change the driving speed of the carrier 8. This point of making the speed variable will be described below with reference to FIG. 4.

Figure 4A:
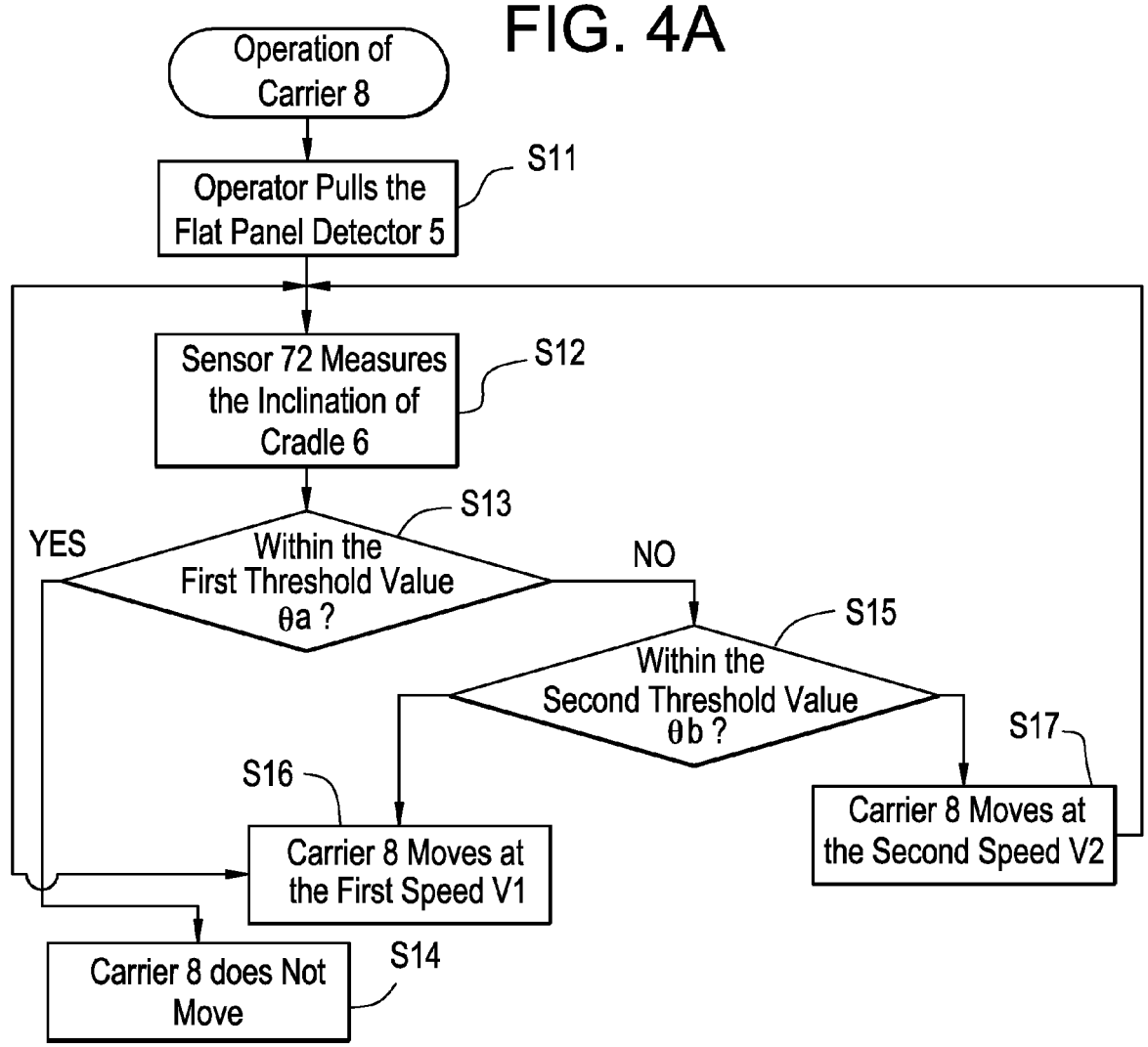
FIG. 4(a) is a flow chart of changing the driving speed in accordance with the inclination of the carrier 8 and a cable 6 and FIG. 4(b) is an enlarged diagram of a cable length adjusting unit 7.
Figure 4B:
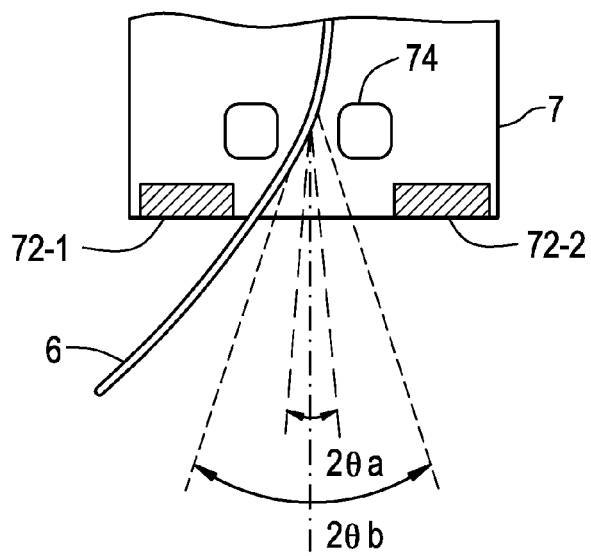

FIG. 4(a) is a flow chart of changing the driving speed in accordance with the inclination of the carrier 8 and FIG. 4(b) is an enlarged diagram of the cable length adjusting unit 7.

In step S11, for obtaining an X-ray radioscopic image of the patient, the operator grasps the handle 59 of the flat panel detector 5. At the same time, the operator pushes the clamp cancel button 93 to release the clamp 74. Then, the operator pulls out the cable 6 while carrying the flat panel detector 5 to the stand 32 or table 42 side. As a result, the cable 6 tilts in a predetermined direction from the vertical bottom position within the cable length adjusting unit 7.

In step S12, the optical sensor 72 measures the inclination of the cable 6. As a result, it becomes clear whether the cable 6 lies within θa or within θb from the vertical bottom position, as shown in FIG. 4(b). Thus, it suffices if such two angles can be measured, with no need of using the sensor 72 that is expensive. Of course, a multi-stage speed control can be done using the optical sensor 72.

In step S13, it is determined whether the cable 6 lies at an angle of within θa, i.e., a first threshold value θa, from the vertical bottom position. If the answer is affirmative, the processing flow advances to step S14, while if the angle is larger than the first threshold value θa, the processing flow advances to step S15.

In step S14, since the cable 6 is at an angle of within θa from the vertical bottom position, it is not necessary to move the carrier 8 in the predetermined direction. This is because the operator has merely pulled the cable 6 to the vertical bottom position from the cable length adjusting unit 7.

In step S15, it is determined whether the cable 6 is at an angle of within θb, i.e., a second threshold value θb, from the vertical bottom position. If the answer is affirmative, the processing flow advances to step S16, while if the angle is larger than the second threshold value θb, the processing flow advances to step S17.

In step S16, the motor driver 118 controls the carrier driving motor 86 so as to move the carrier 8 at a first speed V1. Thereafter, the processing flow advances to step S12, in which the angle of the cable 6 is checked again. In step S13, the carrier driving motor 86 operates until the angle takes a value of within the first threshold value θa.

In step S17, the motor driver 118 controls the carrier driving motor 86 so as to move the carrier 8 at a second speed V2. The second speed V2 is higher than the first speed V1 and is, for example, 1.5 times as high as the first speed. Then, the processing flow advances to step S12 to check the angle of the cable 6 again. As the carrier 8 moves at high speed, the angle at which the cable 6 assumes the vertical bottom position becomes smaller gradually. If the measured angle takes a value of within the second threshold value θb, the carrier 8 is moved at the first speed V1. Further, if the measured angle takes a value of within the first threshold value θa, the processing flow advances to step S14, in which the carrier motor 86 turns OFF.

Although no description has been given above about the tilting direction of the cable 6, the motor drive 118 makes control to move the carrier in −X axis direction when the sensor 72-1 measures the angle and move the carrier in +X axis direction when the sensor 72-2 measures the angle.

Configuration of the flat panel detector 5 and Image processing operation.

Figure 5:
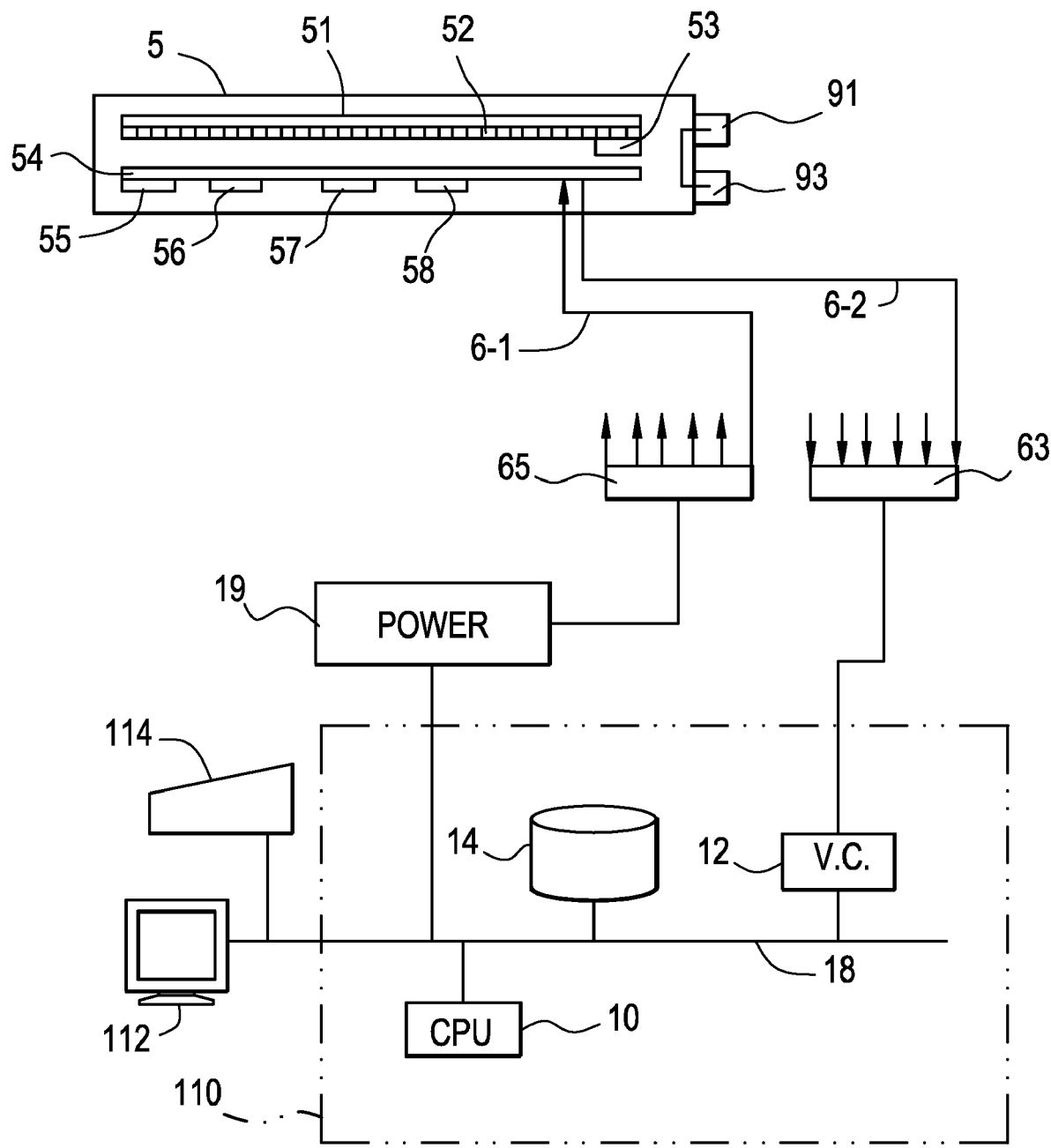
FIG. 5 shows a detailed configuration in connection with components of a flat panel detector 5 and image processing performed within an operation console 110 in the first embodiment.

FIG. 5 shows a detailed configuration in connection with components of the flat panel detector 5 and image processing performed within the operation console 110 in this embodiment.

The flat panel detector 5 is mainly composed of a scintillator 51, a photodetector array 52, an X-ray exposure dose monitor 53 and an electrical substrate 54. On the electrical substrate 54 are mounted a drive circuit 55, an amplifier 56, an AD circuit 57 and a serializer circuit 58. Further, a power cable 6-1 for the transmission of electric power and a signal cable 6-2 for the transmission and reception of signals among the components are laid on the electrical substrate 54.

In the scintillator 51, a matrix substance of a fluorescent material is excited by an X-ray of high energy and fluorescence of a visible region is obtained by recombination energy. The fluorescence is based on such matrix itself as $CaWO_4$ or $CdWO_4$ or is based on a luminescent center substance activated within the matrix such as CSI:TI or ZnS:Ag.

The photodetector array 52 is disposed in close contact with the scintillator 51 to convert light generated in the scintillator into an electric signal. Visible light having passed through the photodetector array 52 is detected by a light receiving element of amorphous silicon formed as a film on the back side of the photodetector array 52.

The X-ray exposure dose monitor 53 monitors the X-ray exposure dose and detects X-ray directly with use of a light receiving element of crystalline silicon.

Under control of a CPU 10, the drive circuit 55 on the electrical substrate 54 drives the photodetector array 52 to read signals from pixels. Intra-sensor matrices are selected by the drive circuit 55 and image data of the matrices are amplified by the amplifier 56. The image data thus amplified by the amplifier 56 are converted into digital signals by the AD circuit 57. Then, the image data thus digitized in order are serialized by the serializer circuit 58 and are transmitted through the signal cable 6-2 to a video capture 12 installed within the operation console 110.

The CPU 10 transmits an image processing command to the video capture 12. The image data having been subjected to a desired image processing in the video capture 12 are displayed on the display 112 and at the same time are stored in a memory 14.

The following description is now provided about an image processing operation for an X-ray radioscopic image.

To dispose the flat panel detector 5 at a desired site of the patient, the operator grasps the flat panel detector 5. First, the operator pushes the clamp cancel button 93 to release the clamp 74 of the cable 6 wirelessly. Then, the operator pulls the handle 59 of the flat panel detector 5 to draw out the cable 6 from the cable length adjusting unit 7. At this time, the carrier 8 moves in the predetermined direction by pulling the cable 6 in such a direction as described above in connection with FIG. 4.

After the flat panel detector 5 has been disposed at the predetermined position, the operator first pushes the clamp button 91. The disposition of the flat panel detector 5 is now over.

Next, the operator issues a radiographic start command to the CPU 10 with use of input means 114 such as a mouse, whereupon a start command is transmitted from the CPU 10 to the electrical substrate 54 within the flat panel detector 5. Further, the CPU 10 transmits a power supply command to a power supply unit 19. Upon receipt of the command, the power supply unit 19 supplies electric power for driving various circuits on the electrical substrate 54 and the photodetector array 52 to the flat panel detector 5 through the power cable 6-1.

At the same time, the CPU 10 drives the X-ray tube 92 through the X-ray controller 98 (FIG. 1) under conditions specified by the X-ray power supply unit 99. Further, the CPU 10 drives the collimator (not shown) to specify an irradiation field and emits an X-ray beam.

The drive circuit 55 on the electrical substrate 54 detects a specified irradiation time or an X-ray and an X-ray irradiation end signal in the X-ray exposure dose monitor 53 and reads out an electric charge by switching. The electric charge thus read out is converted to serialized digital image data via the amplifier 56, AD circuit 57 and serializer circuit 58. The digital image data are transmitted to the video capture 12 within the operation console 110 via the signal cable 6-2.

Second Embodiment

Configuration of Cable Length Adjusting Unit 7 and Carrier 8

Figure 6:
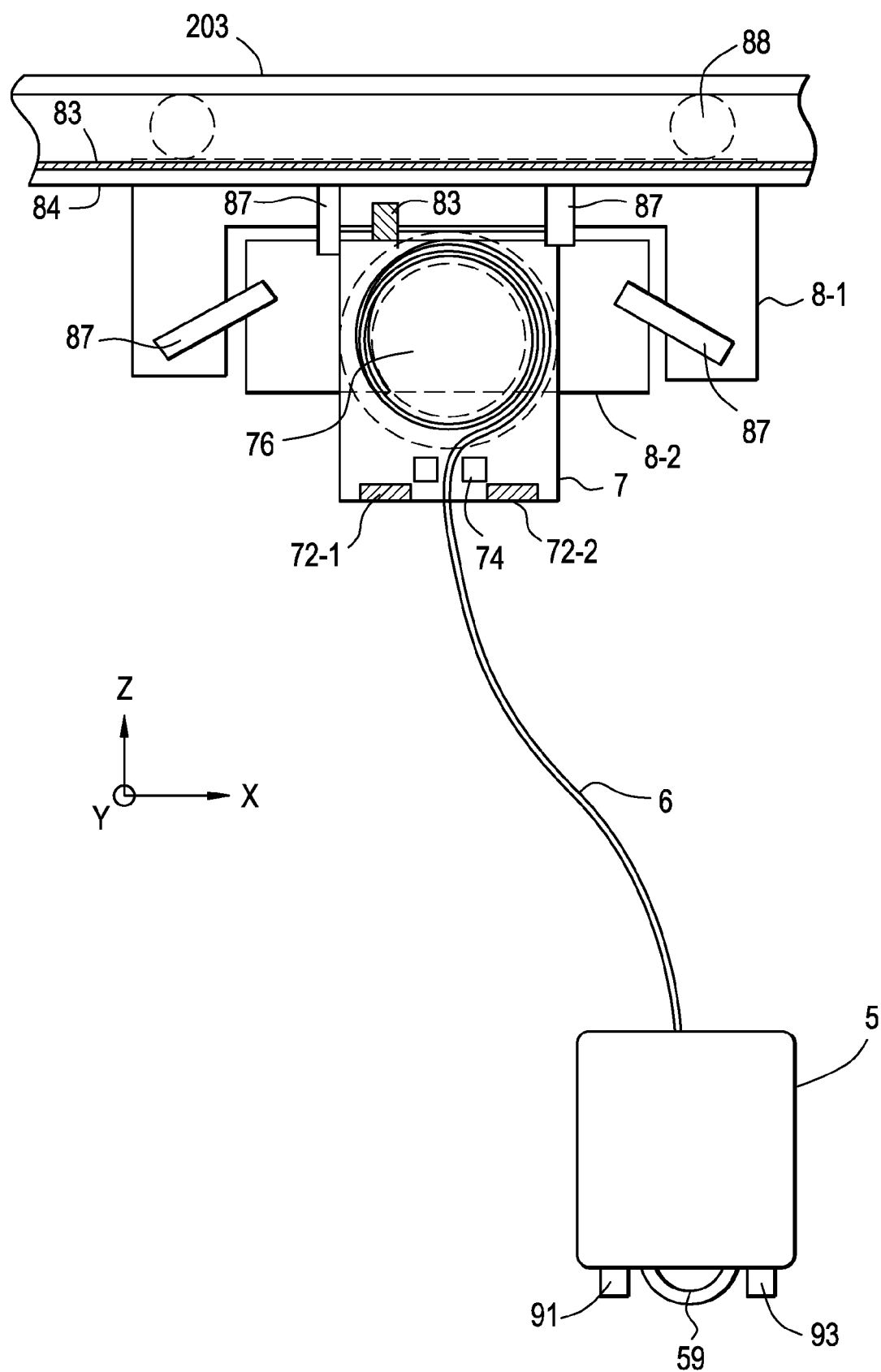
FIG. 6 is a see-through diagram showing a cable length adjusting unit 7 and a carrier 8 in the configuration of an X-ray radiographic system 100 according to a second embodiment of the present invention.

FIG. 6 is a see-through diagram showing a cable length adjusting unit 7 and a carrier 8 in the configuration of an X-ray radiographic system 100 according to a second embodiment of the present invention.

A great difference from the first embodiment described above in connection with FIG. 3 is that the carrier 8 used in this second embodiment has a first carrier 8-1 which can move in X axis direction below a ceiling 203 and a second carrier 8-2 which can move in Y axis direction below the first carrier 8-1. As to the same members having the same functions as those described above in connection with FIG. 3, explanations thereof will partially be omitted.

A rail 84 extends in X axis direction below the ceiling 203. The first carrier 8-1 moves in X axis direction along the rail 84. The rail 84 and the first carrier 8-1 maintain the moving direction through bearings 88. The bearings 88 have a structure which withstands the own weights of the first carrier 8-1, the second carrier 8-2 and the cable length adjusting unit 7. The first carrier 8-1 has a rail shape so that the second carrier 8-2 can move in Y axis direction. Further, for ensuring electrical conduction, a conductive rail 83 and a brush (not shown) are provided along the rail 84.

The second carrier 8-2 has a drive motor (not shown) and moves in Y axis direction. The first carrier 8-1 and the second carrier 8-2 are held by bearings 87 so as to be movable in Y axis direction. Further, for ensuring electrical conduction, a conductive rail and a brush (not shown) are provided by a length corresponding to the length of the first carrier 8-1 which extends in Y axis direction. By thus combining the first carrier 8-1 moving in X axis direction with the second carrier 8-2 moving in Y axis direction, the cable length adjusting unit 7 can be moved in XY plane.

The supply of electric power to the flat panel detector 5 and the transfer digital image data from the flat panel detector 5 are ensured through a cable 6 and conduction to the second carrier 8-2 is ensured through plural ring-like contacts provided concentrically on a take-up reel 76. Further, conduction between the first and second carriers 8-1, 8-2 is ensured through the conductive rail 83.

Although in the above embodiments reference has been made to the X-ray radiographic systems 100 for medical use, the present invention is applicable also to an X-ray radiographic system for industrial use so that an object can be radiographed at various angles.

The invention claimed is:

1. A radiographic system comprising:
   a radiographic panel configured to radiograph in two dimensions a radiation exposed to a subject and output radiation image data;
   a cable for the supply of electric power to the radiographic panel and transfer of the radiation image data;
   a conveyance unit for conveying the cable in a predetermined direction;
   a cable length adjusting unit provided in the conveyance unit to adjust the length of the cable; and
   a movement control unit configured to move the conveyance unit in accordance with a tilting direction of the cable from the cable length adjusting unit to the radiographic panel.

2. A radiographic system according to claim 1, wherein the conveyance unit and the cable length adjusting unit are disposed in the ceiling within a diagnosing room.

3. A radiographic system according to claim 2, further comprising a detector for detecting the tilting direction of the cable.

4. A radiographic system according to claim 3, wherein said detector is located in said cable length adjusting unit.

5. A radiographic system according to claim 2, wherein the cable length adjusting unit has a reel for winding up the cable and a spring for pulling the cable.

6. A radiographic system according to claim 1, further comprising a detector for detecting the tilting direction of the cable.

7. A radiographic system according to claim 6, wherein the moving speed of the conveyance unit is changed in accordance with the angle of the tilting direction detected by the detector.

8. A radiographic system according to claim 6, wherein further comprising an adjusting switch for adjusting the length of the cable.

9. A radiographic system according to claim 8, wherein the radiographic panel has an adjusting switch for adjusting the length of the cable.

10. A radiographic system according to claim 9, wherein the radiographic panel has a handle for grasping the radiographic panel itself, and the adjusting switch is disposed in the handle or in the vicinity of the handle.

11. A radiographic system according to claim 8, wherein a cramp portion for cramping the cable is located on said cable length adjusting unit.

12. A radiographic system according to claim 11, wherein said adjusting switch controls said cramp portion.

13. A radiographic system according to claim 12, wherein said adjusting switch wirelessly controls said cramp portion.

14. A radiographic system according to claim 1, wherein the conveyance unit comprises a first conveyance unit configured to move in the predetermined direction and a second conveyance unit configured to move in a direction orthogonal to the predetermined direction.

15. A radiographic system according to claim 1, further comprising a stand for radiographic the subject in a stand-up state and a table for radiographic the subject in a lying-down state, the stand and the table being each provided with a receptacle shelf for insertion therein of the radiographic panel.

16. A radiographic system according to claim 1, further comprising a stand for radiographic the subject in a stand-up state, the stand being provided with a receptacle shelf for insertion therein of the radiographic panel.

17. A radiographic system according to claim 1, further comprising a table for radiographic the subject in a lying-down state, the table being provided with a receptacle shelf for insertion therein of the radiographic panel.

18. A radiographic system according to claim 1, wherein the cable length adjusting unit has a reel for winding up the cable and a spring for pulling the cable.

* * * * *